Oct. 6, 1953 A. EISENKRAMER 2,654,880

MOUNTING MEANS FOR TELEVISION PICTURE TUBES

Filed July 2, 1951 2 Sheets-Sheet 1

INVENTOR
ARTHUR EISENKRAMER
BY Darby & Darby
ATTORNEYS

INVENTOR
ARTHUR EISENKRAMER
BY Darby & Darby
ATTORNEYS

Patented Oct. 6, 1953

2,654,880

UNITED STATES PATENT OFFICE 2,654,880

MOUNTING MEANS FOR TELEVISION PICTURE TUBES

Arthur Eisenkramer, Westbury, N. Y., assignor to Emerson Radio and Phonograph Corporation, New York, N. Y., a corporation of New York Application July 2, 1951, Serial No. 234,720

4 Claims. (Cl. 340—367)

The present invention relates to means for mounting cathode ray tubes used as picture tubes in television receivers on the chassis of such receivers. More particularly the invention relates to the mounting of a rectangular metal shell picture tube on a metal chassis in a manner to assure that the tube is properly positioned and that there will be no arc over or electrical leakage from the high potential picture tube shell to the grounded chassis.

With the advent of the rectangular picture tube a problem which had not heretofore been present arose, namely, the tube must be mounted on the chassis in such a manner that the tube face is properly positioned with its longer dimension horizontal and with its periphery parallel to and in register with the opening in the decorative mask and the front face of the cabinet. This problem is aggravated by the fact that the contour of the peripheral lip at the face of a typical rectangular metal shell tube is such that no substantial part of this lip is in a plane parallel either to the front face of the cabinet or of the chassis base. When the older round tubes were utilized, the face was circular and did not require a positioning parallel to the cabinet or mask opening. The front lip on such a round tube was in a flat plane parallel with both the chassis and cabinet face, permitting simpler methods of mounting which cannot be satisfactorily applied to a rectangular metal tube.

It is an object of this invention to provide a mounting means for cathode ray tubes utilized in television receivers which will support the tube in a proper fixed position and which will at the same time insulate the tube from other metal parts of the television receiver.

It is another object of the invention to provide such a cathode ray tube mounting particularly adapted for use with a tube having a rectangular face and a metal shell.

It is a further object of the invention to provide a mounting means which will enable a cathode ray tube to be readily assembled in the receiver without the use of jigs or fixtures.

It is another object of the invention to provide a mounting means for a television picture tube particularly a tube having a rectangular metal shell which is less costly than those presently in use and by means of which the tube may be assemled to the chassis without danger of breakage of the tube.

Other objects and features of the invention will be apparent when the following description is considered in connection with the appended drawings, in which—

Figures 1, 3, 4, 5:
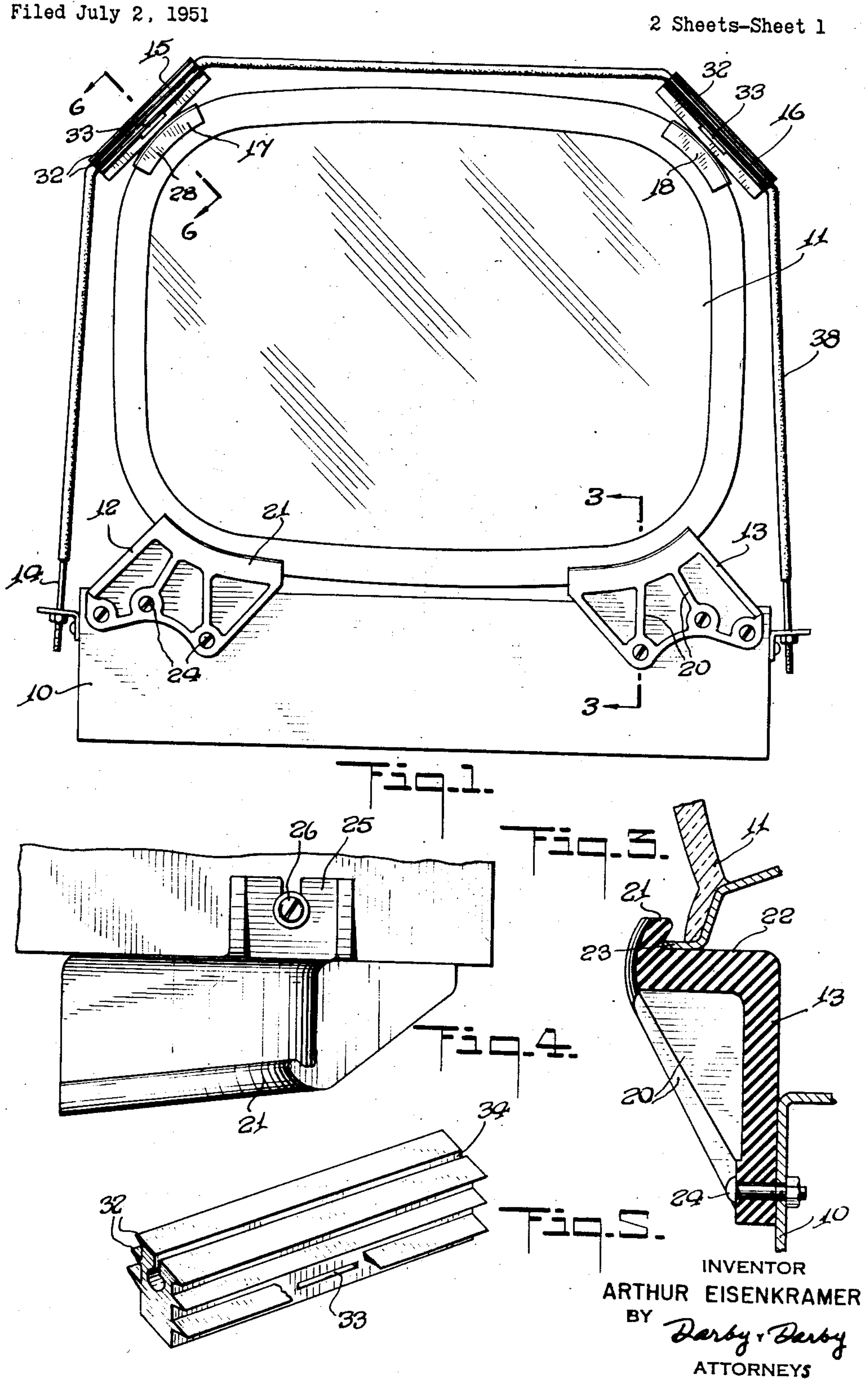
Figure 1 is a front elevational view showing the mounting means of my invention in use to hold a television picture tube to a chassis.
Figure 3 is a fragmentary cross-sectional view of one of the mounting brackets, this view being taken along the line 3—3 of Figure 1.
Figure 4 is a top plan view of the bracket illustrated in Figures 1 to 3.
Figure 5 is a perspective view of a tube clamp insulator such as is shown at the upper side of the tube in Figures 1 and 2.
Figure 2:
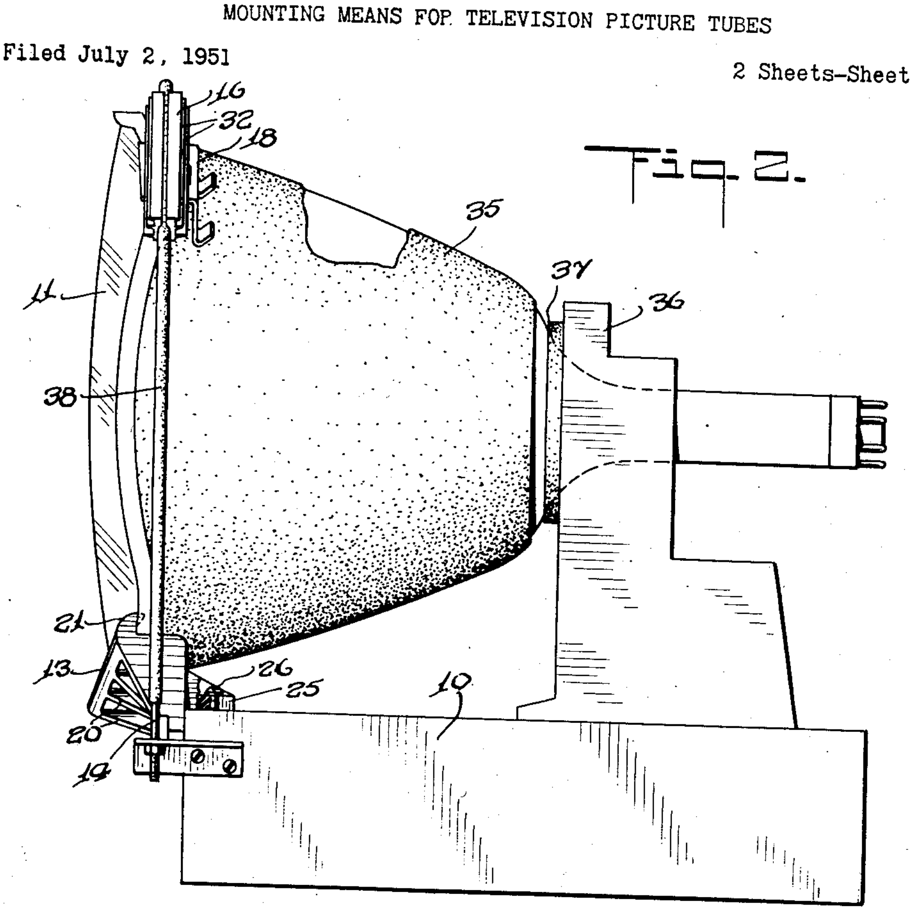
Figure 2 is a side elevational view of the device of Figure 1.

Referring now to the drawings there is shown at 10 the usual chassis of a television receiver on which is mounted the cathode ray tube 11. In accordance with my invention the tube is supported at its lower front edge on two brackets 12 and 13 and is held in position by means of a rod 14 which passes through the insulators 15 and 16 and holds the tube in place through cooperation of those insulators with the tube clamps 17 and 18, respectively. The rod 14 is screw-threadedly fixed to small brackets which are in turn fixed to the chassis 10 as will be described.

Each lower mounting bracket 12 or 13 is made of a suitable rigid insulating material, such as alkyd resin, molded to the general shape shown in Figure 3 and being provided with ribs 20 in order to render the structure rigid. These brackets, as best shown in Figure 4, have an upstanding lip 21 which is shaped to conform to the contour of the tube lip or rim and against which the edge of that tube lip rests when a tube is mounted in accordance with my invention.

Likewise, the brackets are provided with a surface 22 which is shaped to conform with the forward surface of the rectangular metal shell of the cathode ray tube. As will be seen particularly in Figure 3 the upstanding lip 21 has an overhanging inner or rearward edge which serves to fit over the lip 23 of the cathode ray tube 11.

As will be obvious from Figure 1, the brackets 12 and 13 are symmetrical as respects the vertical tube axis, that is, these brackets are made in left and right hand versions.

The brackets 12 and 13 are fastened to the front face of the chassis 10 by any suitable means such for example as the screws 24. Additionally, these brackets are provided with integral rearwardly extending ears 25 which overlie the forward upper edge of the chassis and are fastened thereto by means of screws 26 in order to assure that the brackets will not tip.

The tube clamps 17 and 18 are formed of metal being preferably stamped and comprise the body portion 27, the bent over forward edge 28 which cooperates with the lip 23 of the television receiving tube, two downwardly extending ears 30 which rest against the metal shell of the television tube, and an upwardly extending bent over ear 31 which extends into a slot in the tube clamp insulator such as those shown at 15 and 16 in Figure 1.

Figures 6, 7, 8:
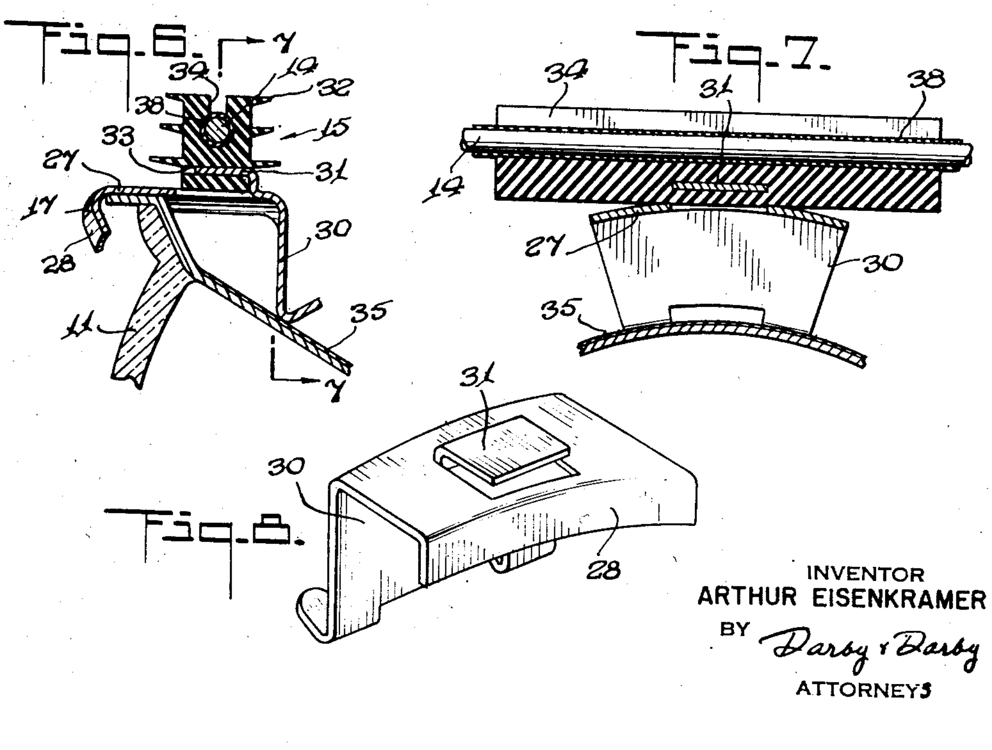
Figure 6 is a cross-sectional view of the tube clamp and insulator, the view being taken on the plane of the line 6—6 of Figure 1.
Figure 7 is a transverse cross-sectional view of the tube clamp and insulator of Figure 6, the view being taken on the plane of the line 7—7 of Figure 6.
Figure 8 is a perspective view of one of the upper tube clamps.

As is shown particularly in Figure 6 the bent over ear 31 of the tube clamp 17 is inserted in a slot in insulator 15. The insulator 15 is a block of polyethylene which is preferably extruded and which has formed thereon fins 32. Additionally, the polyethylene block has a slot 33 machined therein for cooperation with bent over ear 31 of the tube clamp 17 and also has formed therein a slot 34 extending along its upper surface, this slot being enlarged and rounded at the bottom to receive the hold-down rod 14.

The fins 32 are provided in order to prevent electrical leakage from the metal clamps 17 contacting the tube shell, along the surface of the insulator to the grounded hold-down rod 14. It should also be mentioned at this point that the tube 11 is provided with the usual insulating boot shown at 35 which boot is fixed to the tube in any suitable known manner and that the tube is held in position at its rearward end by means of the usual bracket structure 36 which surrounds the tube neck and holds the tube in forward position against the lips 21 of brackets 12 and 13. This serves to engage the tube lip 23 in the bracket lip 21 to retain the picture tube in the event that the hold-down rod 14 is not sufficiently tightened or becomes loosened. The bracket lip 21 also assists in properly positioning the tube by preventing insertion of the tube lip 23 in the brackets 12 and 13 unless the long side of the tube is parallel to the horizontal surface of the chassis base. In the usual manner compressible gasket 37 is provided between the front face of the bracket 36 and the generally conical surface of the tube 11.

The hold-down rod 14 is provided with an insulating sleeve 38, see Figures 1 and 6, which sleeve terminates adjacent the ends of the rod 14.

In assembling the mounting means of my invention the brackets 12 and 13 are first fixed to the chassis in the manner already indicated. The insulating tube 38, which is preferably of polyethylene, is placed over the hold-down rod 14 which hold-down rod is preformed to the shape indicated in Figure 1 and the tube clamps 17 and 18 fixed to the insulators 15 and 16 which are then snapped over the rod 14. All that is then necessary is to place the tube in position on the brackets 12 and 13, place the tube clamps 17 and 18 in position as shown in Figure 1 with the hold-down clamping rod 14 extending downwardly and through holes or slots in the small chassis brackets and then tighten the nuts on the rod 14 until the receiver tube 11 is firmly held in place. It should be noted that the hold-down rod is so proportioned that the assembler does not have to utilize judgment as to the degree of tightening of the rod. In past arrangements wherein a strap was used which was passed around the rim of the tube and screw threadedly or otherwise tightened, it was entirely possible to damage the tube by bending the metal shell thereby by cracking the glass-to-metal seal.

By my present arrangement, before any such damage can occur, the portions of the rod 14 which extend through the insulators 15 and 16 will bend and the assembler, observing such bending, will cease to tighten the hold-down rod nuts.

While I have described a preferred embodiment of my invention it will be understood that many other modifications thereof may be made within the spirit thereof and consequently I wish to be limited not by the foregoing description, but solely by the claims granted me.

What is claimed is:

1. In a device for mounting a rectangular metal shell cathode ray tube on a television receiver chassis, the combination comprising a pair of brackets of electrical insulating material fixed to the chassis at the upper corner of the front wall thereof, said brackets having an upper surface shaped to conform to the forward portion of the metallic shell of the cathode ray tube and having an upwardly and rearwardly extending lip shaped to conform to a portion of the lip of the cathode ray tube and supporting the forward edge of the cathode ray tube, a pair of tube clamps resting upon the upper corners of the forward edge of the cathode ray tube, a pair of insulators one fastened to each of said clamps and a preformed rod extending through said insulators and fastened at its ends to the chassis to exert pressure on said insulators and said clamps to thereby clamp the cathode ray tube against said brackets.

2. In a device for mounting a rectangular metal shell cathode ray tube on a television receiver chassis, the combination comprising a pair of brackets fixed to the chassis at the upper corners of the front wall thereof, said brackets serving to support the forward end of the cathode ray tube, a pair of metallic tube clamps resting upon the upper corners of the forward edge of the cathode ray tube, a pair of polyethylene insulators one fastened to each of said clamps, each said clamp being provided with an ear which extends into a cooperating slot in the corresponding polyethylene insulator, said insulators being provided with fins on the opposite sides thereof to prevent electrical leakage, and a preformed rod extending through said insulators and fastened at its ends to the chassis to exert pressure on said insulators and said clamps to thereby clamp the cathode ray tube against said brackets.

3. A device in accordance with claim 1, wherein said clamps are provided with bent-over edges cooperating with a rim of the cathode ray tube, and with bent ears extending generally downwardly and pressing against the metal shell of the cathode ray tube and further characterized in that said clamps have an upwardly and generally horizontally extending ear which cooperates with a slot in said clamp insulators to position said clamps with respect to said insulators.

4. A device as claimed in claim 2, characterized in that said brackets are made of alkyd resin shaped to conform to the shape of the rim of the cathode ray tube, and further characterized in that said insulators are provided with slotted upper surfaces, said slots being enlarged at their bases to provide means for positioning and retaining said insulators on said clamping rods and further characterized in that said rod is in the shape of an inverted U having inclined portions joining the base to each arm thereof, said inclined portions being substantially equal to the length of said insulators and serving to position said insulators on said rod, said rod being provided with a polyethylene sleeve which extends through substantially its entire length.

ARTHUR EISENKRAMER.

References Cited in the file of this patent

UNITED STATES PATENTS

| Number | Name | Date |
|---|---|---|
| 2,484,345 | Hinz | Oct. 11, 1949 |
| 2,551,790 | Davis et al. | May 8, 1951 |
| 2,602,113 | Fisch | July 1, 1952 |